United States Patent
Calnek et al.

(10) Patent No.: US 8,988,025 B2
(45) Date of Patent: Mar. 24, 2015

(54) SYSTEMS AND METHODS FOR CONTROLLING A BRUSHLESS MOTOR

(75) Inventors: Scott Calnek, Ontario (CA); David M. Zevchak, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 13/354,823

(22) Filed: Jan. 20, 2012

(65) Prior Publication Data
US 2013/0187584 A1 Jul. 25, 2013

(51) Int. Cl.
| H02P 6/12 | (2006.01) |
| H02P 6/08 | (2006.01) |
| F02D 41/30 | (2006.01) |
| F04B 17/03 | (2006.01) |
| F02D 41/22 | (2006.01) |

(52) U.S. Cl.
CPC ............. *H02P 6/08* (2013.01); *F02D 41/3082* (2013.01); *F04B 17/03* (2013.01); *F02D 41/221* (2013.01); *F02D 2041/226* (2013.01); *F02D 2400/08* (2013.01)
USPC .......... 318/400.21; 318/79; 318/80; 318/144; 318/766; 318/826

(58) Field of Classification Search
USPC .................................. 318/139, 400.02–400.09
See application file for complete search history.

(56) References Cited

U.S. PATENT DOCUMENTS

| 5,486,747 A * | 1/1996 | Welch ........................... 318/811 |
| 5,517,631 A * | 5/1996 | Machado et al. ............. 711/111 |
| 5,689,159 A | 11/1997 | Culp et al. |
| 5,957,985 A * | 9/1999 | Wong et al. ................... 701/29.2 |
| 2005/0280570 A1* | 12/2005 | Kanekawa et al. ............ 341/155 |
| 2008/0067869 A1* | 3/2008 | Evans et al. ..................... 307/11 |
| 2009/0256507 A1* | 10/2009 | Thompson et al. ...... 318/400.13 |
| 2009/0295317 A1* | 12/2009 | Townsend et al. ......... 318/400.4 |
| 2011/0080127 A1* | 4/2011 | Akama et al. ............ 318/400.21 |
| 2011/0238249 A1* | 9/2011 | Ananthakrishna .............. 701/22 |
| 2011/0316459 A1* | 12/2011 | Kawamura et al. ...... 318/400.21 |
| 2012/0101663 A1* | 4/2012 | Fervel et al. ...................... 701/3 |
| 2012/0265359 A1* | 10/2012 | Das et al. ....................... 700/292 |
| 2013/0127386 A2* | 5/2013 | Lelkes ..................... 318/400.42 |

FOREIGN PATENT DOCUMENTS

| CN | 101562421 A | 10/2009 |
| DE | 19835576 A1 | 6/1998 |

OTHER PUBLICATIONS

Chinese Office Action for Application No. 201310104122.0; dated Nov. 21, 2014; 2 pgs.

* cited by examiner

*Primary Examiner* — Eduardo Colon Santana
*Assistant Examiner* — Said Bouziane
(74) *Attorney, Agent, or Firm* — Cantor Colburn LLP

(57) ABSTRACT

A system for controlling a brushless motor includes drive circuitry in communication with the brushless motor and a primary control device in communication with the drive circuitry. The system also includes a secondary control device in communication with the drive circuitry and a multiplexer for selectively providing an output of the primary control device or an output of the secondary control device to the drive circuitry, wherein the output of the primary control device is provided to the drive circuitry when the primary control device is operating normally.

16 Claims, 4 Drawing Sheets

SYSTEMS AND METHODS FOR CONTROLLING A BRUSHLESS MOTOR

FIELD OF THE INVENTION

The subject invention relates generally to systems and methods for controlling a brushless motor, and more specifically to systems and methods for controlling a brushless fuel pump.

BACKGROUND

Brushless motors, also known as electronically commutated motors, are electric motors that are powered by direct-current and have electronic commutation systems, rather than mechanical commutators and brushes. A brushless motor has permanent magnets which rotate and a fixed armature, eliminating the problems of connecting current to the moving armature. An electronic controller replaces the brush/commutator assembly of the brushed motor, which continually switches the phase to the windings to keep the motor turning. The controller performs similar timed power distribution by using a solid-state circuit rather than the brush/commutator system.

Brushless motors offer several advantages over brushed motors, including more torque per weight, more torque per watt, increased reliability, reduced noise, longer lifetime, elimination of ionizing sparks from the commutator, and overall reduction of electromagnetic interference. With no windings on the rotor, they are not subjected to centrifugal forces, and because the windings are supported by the housing, they can be cooled by conduction, requiring no airflow inside the motor for cooling. This in turn means that the motor can be entirely enclosed and protected from dirt or other foreign materials. However, brushless motors do require more complex and expensive control electronics than brushed motors. Brushless motors are typically controlled by a microprocessor to provide phase commutation, keeping the stator current in phase with the permanent magnets of the rotor. Without electronic commutation the brushless motor can not be properly controlled.

Brushless motors have been used in fuel pumps designed for a wide range of automotive applications. Brushless motors are growing in popularity but currently they have limited application in North America. They provide reliable, uninterrupted fuel flow at system pressure, high efficiencies, improved durability, wide-ranging harsh fuels compatibility, and reduced power consumption. Brushless fuel pumps are typically controlled by a micro-controller. In order for motor commutation to begin the micro-controller must complete its initialization routines. Extended initialization time can affect the ability of the motor/pump to achieve system level targets in the required timeframe. Failure of the microcontroller will immediately suspend the commutation functionality, preventing the brushless fuel pump from operating. Accordingly, it is desirable to provide a system and method for reliably controlling a brushless fuel pump.

SUMMARY OF THE INVENTION

In one exemplary embodiment, a system for controlling a brushless motor includes drive circuitry in communication with the brushless motor and a primary control device in communication with the drive circuitry. The system also includes a secondary control device in communication with the drive and a multiplexer for selectively providing an output of the primary control device or an output of the secondary control device to the drive circuitry, wherein the output of the primary control device is provided to the drive circuitry when the primary control device is operating normally.

In another exemplary embodiment, a method for controlling a brushless fuel pump includes receiving a fuel control enable signal from an electronic control module and determining an operational state of a primary or secondary control device. The method also includes responsively providing an output of the primary control device or a secondary control device to a drive circuitry that is in communication with the brushless fuel pump, wherein the output of the primary control device is provided to the drive circuitry when the operational state of the primary control device is normal and wherein the output of the secondary control device is provided to the drive circuitry when the operational state of the primary control device is not normal.

In yet another exemplary embodiment, a system for controlling a brushless fuel pump includes drive circuitry in communication with the brushless fuel pump, a primary control device in communication with a multiplexer and a secondary control device in communication with the multiplexer. The system also includes a monitor circuit in communication with the primary control device and the multiplexer, wherein the monitor circuit is operable for receiving a signal generated by the primary control device and responsively providing a status signal to the multiplexer. The multiplexer selectively provides an output of the primary control device or an output of the secondary control device to the drive circuitry based upon the status signal.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses.

Figure 1:
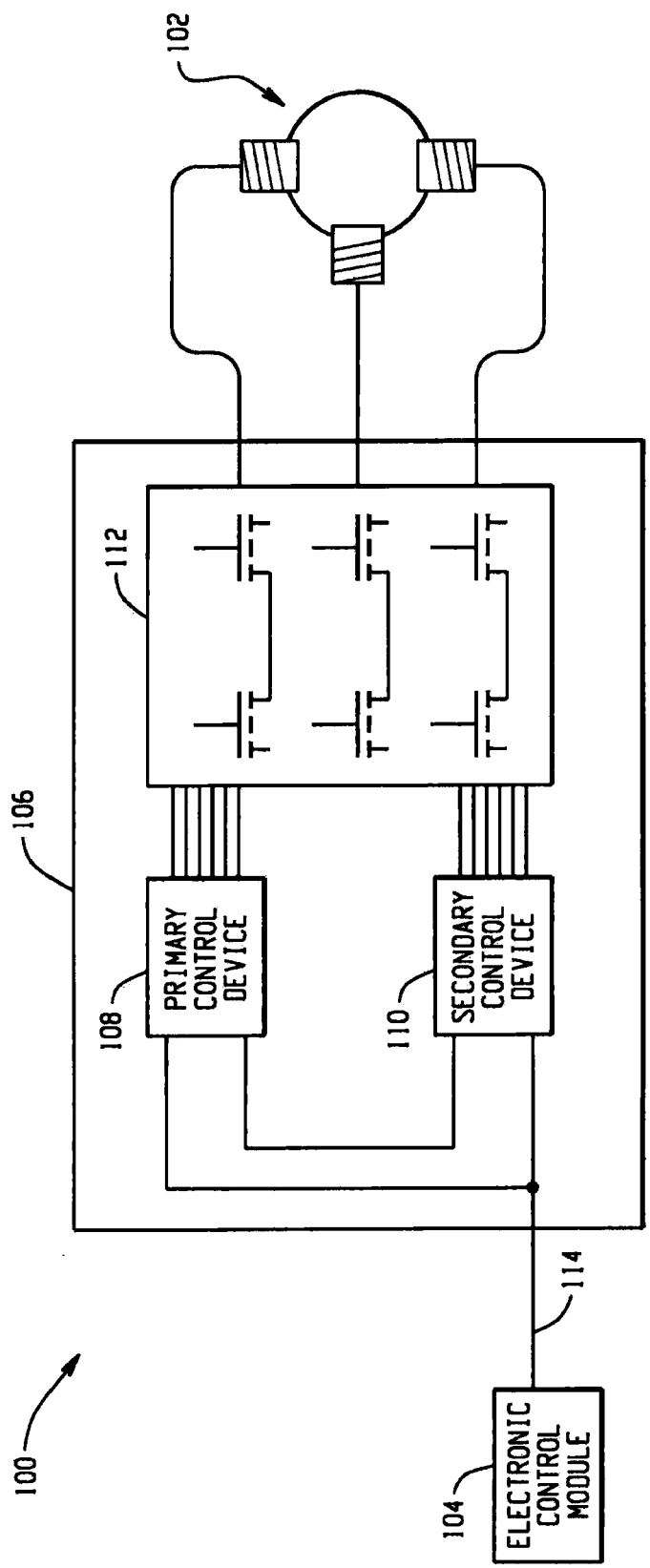
FIG. 1 is a block diagram of a system for controlling a brushless fuel pump in accordance with an exemplary embodiment.

Referring now to FIG. 1, a block diagram of a system 100 for controlling a brushless fuel pump 102 in accordance with an exemplary embodiment is shown. The system 100 includes an electronic control module 104 and a brushless fuel pump controller 106. The brushless fuel pump controller 106 receives a fuel control enable signal 114 from the electronic control module 104 and responsively controls the operation of the brushless fuel pump 102. The brushless controller 106 includes a primary control device 108, a secondary control device 110 and drive circuitry 112. The outputs of both the primary control device 108 and the secondary control device 110 may be connected to the drive circuitry 112. In exemplary embodiments, the primary control device 108 may be a micro-controller.

In exemplary embodiments, the electronic control module 104 may perform a number of conventional engine control and diagnostic operations including, providing a fuel control enable signal 114 to the brushless fuel pump controller 106. The fuel control enable signal 114 instructs the brushless fuel pump controller 106 to activate the brushless fuel pump 102. The electronic control module 104 may also provide various additional signals to the brushless fuel pump controller 106 in order to indicate control requests and system states.

In exemplary embodiments, the brushless fuel pump controller 106 includes drive circuitry 112 that is designed to control the operation of the brushless fuel pump 102. In one embodiment, the drive circuitry 112 may include one or more bi-directional outputs to drive high-current DC power to the brushless fuel pump 102. The drive circuitry 112 is adapted to receive control signals from both the primary control device 108 and the secondary control device 110. In one embodiment, the brushless fuel pump controller 106 selectively forwards the output of either the primary control device 108 or the secondary control device 110 to the drive circuitry 112.

The brushless fuel pump controller 106 is designed such that the primary control device 108 is primarily responsible for operating the brushless fuel pump 102. The primary control device 108 is capable of operating the brushless fuel pump 102 at a variety of speeds depending on the operating conditions and the fuel requirements of the vehicle, which may be received from the electronic control module 104. In addition, the primary control device 108 is capable of performing diagnostic tests on the brushless fuel pump 102. If the primary control device 108 fails, or is not operating normally, the secondary control device 110 will be used to operate the brushless fuel pump 102. By utilizing both the primary control device 108 and the secondary control device 110, the brushless fuel pump controller 106 ensures that the brushless fuel pump 102 will have a control redundancy.

In exemplary embodiments, the secondary control device 110 of the brushless fuel pump controller 106 operates the brushless fuel pump 102 when the primary control device 108 is not available, or not functioning properly. The primary control device 108 may be unavailable due to a failure of the primary control device 108, during initialization of the primary control device 108, or for various other reasons. In exemplary embodiments, the secondary control device 110 may be a simple integrated circuit, such as an application-specific integrated circuit (ASIC) or a field-programmable gate array (FPGA). The secondary control device 110 is designed such that it has a substantially shorter initialization time relative to the primary control device 108. In addition, the secondary control device 110 is substantially less expensive than the primary control device 108.

Figure 2:
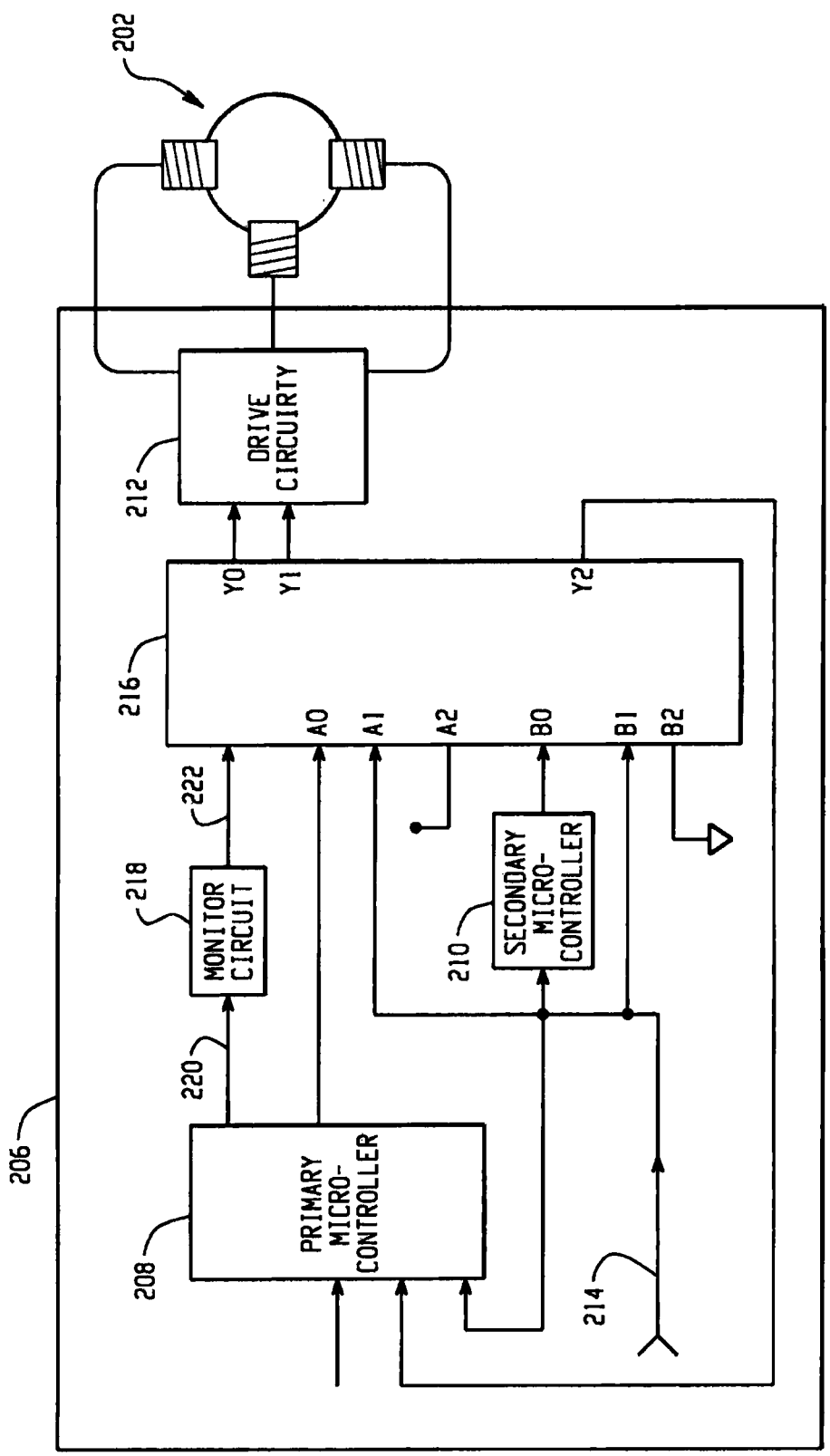
FIG. 2 is a block diagram of a brushless fuel pump controller for controlling a brushless fuel pump in accordance with an exemplary embodiment.

Referring now to FIG. 2, a block diagram of a brushless fuel pump controller 206 for controlling a brushless fuel pump 202 in accordance with an exemplary embodiment is shown. The brushless fuel pump controller 206 includes drive circuitry 212 in communication with the brushless fuel pump 202, a primary micro-controller 208 and a secondary control device 210. In addition, the brushless fuel pump controller 206 includes a multiplexer 216 in communication with the drive circuitry 212, the secondary control device 210, the primary micro-controller 208 and a monitor circuit 218. The multiplexer 216 selectively forwards the output of either the primary micro-controller 208 or the secondary control device 210 to the drive circuitry 212, which controls the operation of the brushless fuel pump 202. In one embodiment, the multiplexer 216 may use a status signal 222 received from the monitor circuit 218 to select between the output of the primary micro-controller 208 or the secondary control device 210.

The primary micro-controller 208 generates a pulse signal 220 that is provided to the monitor circuit 218. The pulse signal 220 is used to indicate that the primary micro-controller 208 is operating normally. In one embodiment, the primary micro-controller 208 may be designed such that the pulse signal 220 includes pulses generated on a fixed time interval, for example every 5 milliseconds, when the primary micro-controller 208 is operating normally. In another embodiment, the primary micro-controller 208 may be designed such that the pulse signal 220 includes pulses of a fixed voltage level, for example 5 volts, when the primary micro-controller 208 is operating normally. For example, the primary micro-controller 208 can be designed to provide the pulse signal 220 to the monitor circuit 218 only once it has been initialized and is operating normally. In exemplary embodiments, when the primary micro-controller 208 is operating normally the voltage level and/or frequency of the pulses will be approximately equal to or above defined threshold values.

The monitor circuit 218 receives the pulse signal 220 and responsively generates a status signal 222 that is provided to the multiplexer 216. In one embodiment, the monitor circuit 218 uses various circuit elements to monitor the pulse signal 220 and responsively generate the status signal 222. For example, if the monitor circuit 218 receives a pulse of a sufficient voltage level at least once during a time period it will generate a status signal that indicates the primary micro-controller 208 is operating normally. In one embodiment, the status signal 222 generated by the monitor circuit may be a binary signal that indicates the operational state of the primary micro-controller. For example, the status signal 222 may have a high value indicating that the operational state of the primary micro-controller 208 is normal and a low value indicating that the operational state of the primary micro-controller 208 is not normal. In one embodiment, the monitor circuit 218 may utilize a capacitor that is periodically charged by the pulse signal 220 and responsively generate the status signal 222 based upon whether the charge stored by the capacitor exceeds a threshold value.

In one embodiment, the multiplexer 216 receives the output from the primary micro-controller 208, the output from the secondary control device 210, the fuel control enable signal 214 and the status signal 222. The multiplexer 216 provides the fuel control enable signal 214 to the drive circuitry 212 and selectively provides the output from the primary micro-controller 208 or the output from the secondary control device 210 to the drive circuitry 212. Using the output from the primary micro-controller 208 or the secondary control device 210 in combination with the fuel control enable signal 214, the drive circuitry 212 controls the operation of the brushless fuel pump 202. In one embodiment, the output of multiplexer 216 may also be provided to the primary micro-controller 208 to allow the primary micro-controller 208 to understand the operational state of the multiplexer 216.

Figure 3:
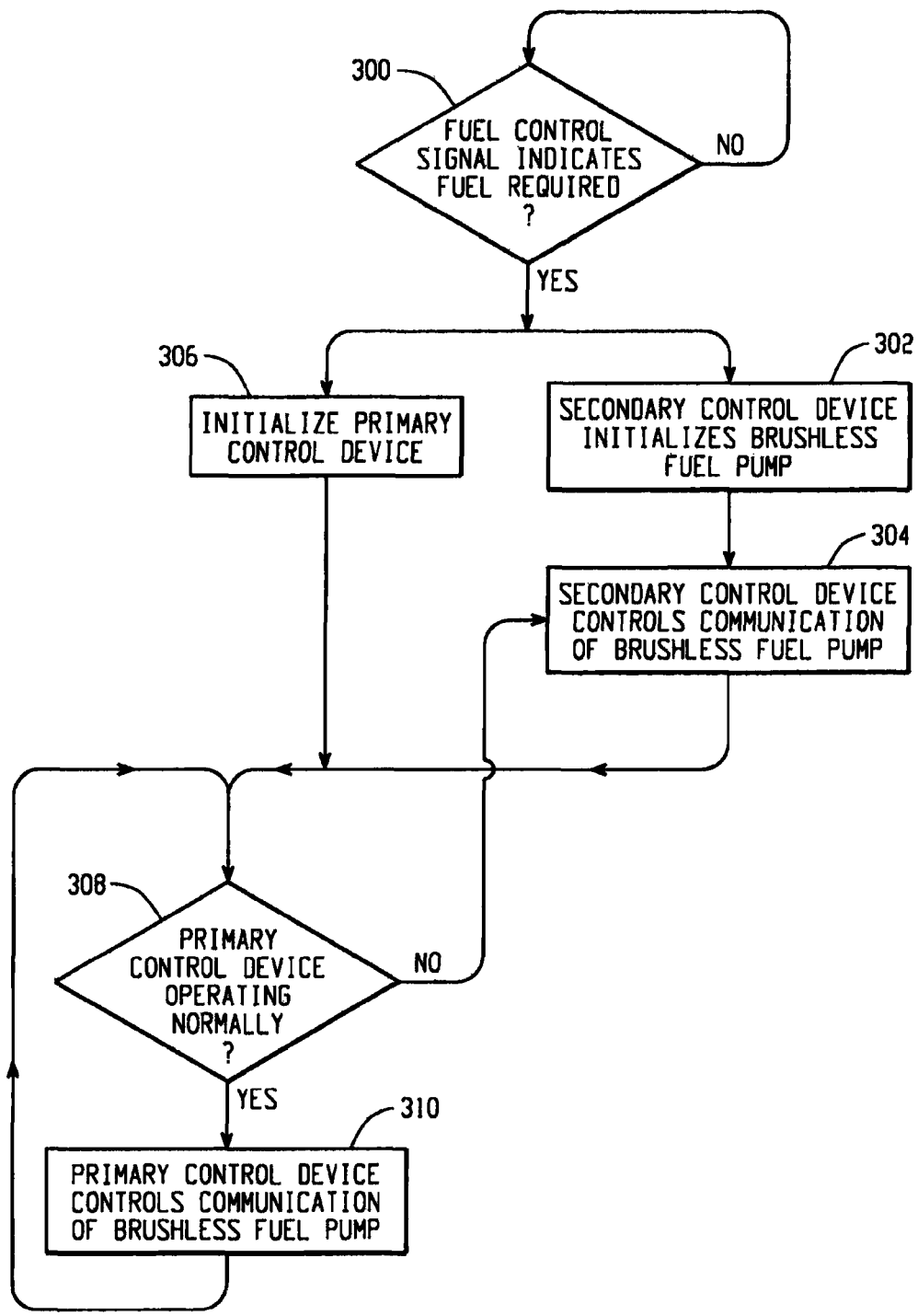
FIG. 3 is a flow chart illustrating a method for controlling a brushless fuel pump in accordance with an exemplary embodiment.

Referring now to FIG. 3, a flow diagram illustrating a method for controlling a brushless fuel pump in accordance with an exemplary embodiment is shown. As shown at decision block 300, the method includes determining the status of the fuel control enable signal. If the fuel control enable signal is false, or otherwise indicates that the fuel is not required then no action is taken. Otherwise, the method includes using the secondary control device to initialize the brushless fuel pump, as shown at block 302. The initialization can include align the brushless fuel pump to determine the rotor position. The initialization can also include injecting a frequency into one winding of the brushless fuel pump and observing at the response on the others windings. Once the brushless fuel pump has been initialized, the secondary control device is used to control commutation of the brushless fuel pump, as shown at block 304. In addition, the method includes initializing the primary control device, as shown at block 306. As shown at decision block 308, the method includes monitoring the operational state of the primary control device. If the primary control device is operating normally, the primary control device is used to actively control the commutation of the brushless fuel pump, as shown at block 310. If the primary control device is not operating normally, the secondary control device is used to control the commutation of the brushless fuel pump, as shown at block 304.

Figure 4:
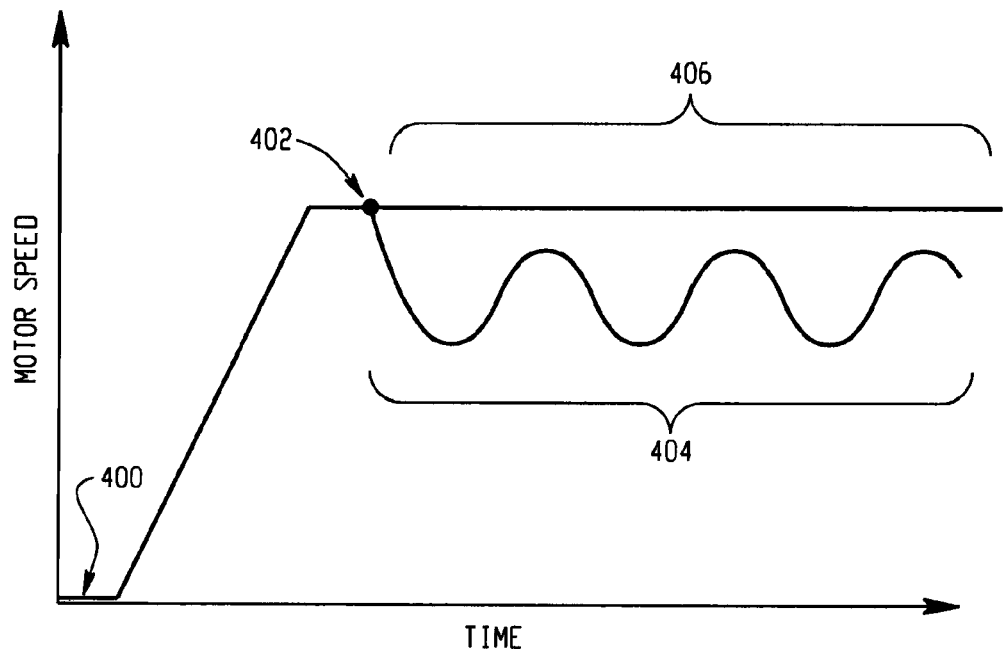
FIG. 4 is a graph illustrating the motor speed of the brushless fuel pump during initialization and operation.

Referring now to FIG. 4, a graph illustrating the motor speed of the brushless fuel pump during start-up and operation is shown. As shown, as use of the brushless fuel pump is initiated, there is an alignment phase 400 where the secondary control device aligns or determines the rotor position of the brushless fuel pump motor and the brushless fuel pump motor is not operational. In exemplary embodiments, the alignment phase 400 may not be required depending on the commutation scheme of the brushless fuel pump motor. Once the rotor position is known, the secondary control device ramps up the brushless fuel pump motor speed to the constant operational speed the secondary control device is designed to operate at. At the illustrated initialization transition point 402, the primary control device may assume active control 404 of the brushless fuel pump and vary the brushless fuel pump motor speed as desired. In the event that the primary control device is not functioning, the secondary control device will continue to operate the brushless fuel pump motor at a constant speed 406.

Figure 5:
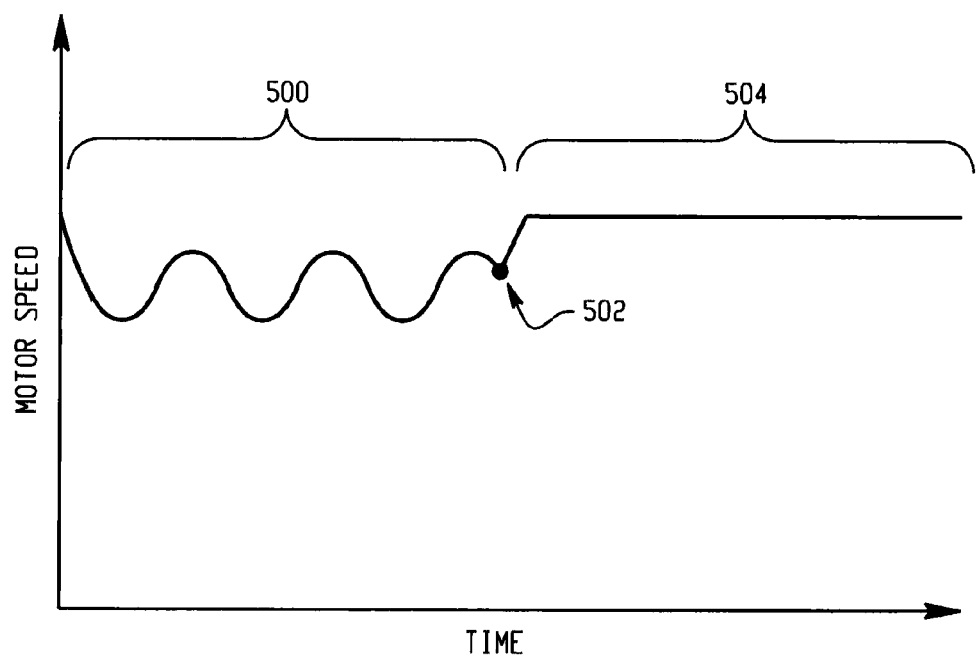
FIG. 5 is a graph illustrating the motor speed of the brushless fuel pump during operation.

Referring now to FIG. 5, another graph illustrating the motor speed of the brushless fuel pump during operation is shown. As shown, the primary control device actively controls the speed of the brushless fuel pump during normal operation 500 and varies the brushless fuel pump motor speed as desired. In the event that the primary control device fails 502, the secondary control device will assume operation of the brushless fuel pump and operate it at a constant speed 504.

Although primarily discussed in connection with a brushless fuel pump, it will be apparent to one of ordinary skill in the art that the methods and systems disclosed herein may be used to operate brushless motors in a wide variety of applications. For example, the fuel control enable signal can be more generally referred to as a master control signal that is used for controlling the operational mode of the brushless motor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, elements, components, and/or groups thereof.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A system for controlling a brushless motor comprising:
    drive circuitry in communication with the brushless motor;
    an electronic control module configured to provide an enable signal for the brushless motor;
    a primary control device in communication with the drive circuitry and the electronic control module;
    a secondary control device in communication with the drive circuitry and the electronic control module; and
    a multiplexer for selectively providing an output of the primary control device or an output of the secondary control device to the drive circuitry, wherein an output of the secondary control device is provided to the drive circuitry to initialize the brushless motor and bring the brushless motor to a desired speed and wherein upon the brushless motor reaching the desired speed the output of the primary control device is provided to the drive circuitry when-so long as the primary control device is operating normally,
    wherein the secondary control device is comprised of rudimentary circuitry, an ASIC, a FPGA or a micro controller, which is configured to operate the brushless motor at an approximately constant speed that is equal to the desired speed.

2. The system of claim 1, wherein the output of the secondary control device is connected to the drive circuitry when a failure of the primary control device is detected.

3. The system of claim 1, wherein the output of the secondary control device is connected to the drive circuitry when the primary control device is initializing.

4. The system of claim 1, wherein the primary control device generates a pulse signal when it is operating normally and wherein a monitor circuit receives the pulse signal from the primary control device and responsively provides the multiplexer with a status signal.

5. The system of claim 4, wherein the status signal indicates if the primary control device is operating normally.

6. The system of claim 1, wherein the secondary control device has a substantially shorter initialization time than the primary control device.

7. A method for controlling a brushless fuel pump comprising:
receiving a fuel control enable signal from an electronic control module;
determining an operational state of a primary control device; and
responsively providing an output of the primary control device or a secondary control device to a drive circuitry that is in communication with the brushless fuel pump, wherein the output of the secondary control device is provided to the drive circuitry to initialize the brushless fuel pump and bring the brushless fuel pump to a desired speed and wherein upon the brushless fuel pump reaching the desired speed the output of the primary control device is provided to the drive circuitry so long as operational state of a primary control device is normal,
wherein the secondary control device is comprised of rudimentary circuitry, an ASIC, a FPGA or a micro controller, which is configured to operate the brushless fuel pump at an approximately constant speed.

8. The method of claim 7, wherein determining an operational state of the primary control device comprises monitoring a pulse signal generated by the primary control device when it is operating normally.

9. The method of claim 7, wherein the primary control device is capable of operating the brushless fuel pump at a variety of speeds.

10. The method of claim 7, wherein the primary control device is capable of preforming diagnostic tests on the brushless fuel pump.

11. A system for controlling a brushless fuel pump comprising:
an electronic control module configured to provide an enable signal for the brushless fuel pump;
drive circuitry in communication with the brushless fuel pump;
a primary control device in communication with a multiplexer and the electronic control module;
a secondary control device in communication with the multiplexer and the electronic control module; and
a monitor circuit in communication with the primary control device and the multiplexer, wherein the monitor circuit is operable for receiving a signal generated by the primary control device and responsively providing a status signal to the multiplexer;
wherein the multiplexer selectively provides an output of the primary control device or an output of the secondary control device to the drive circuitry based upon the status signal, wherein the output of the secondary control device is provided to the drive circuitry to initialize the brushless fuel pump and bring the brushless fuel pump to a desired speed and wherein upon the brushless fuel pump reaching the desired speed the output of the primary control device is provided to the drive circuitry so long as the status signal indicates that the primary control device is operating normally,
wherein the secondary control device is comprised of rudimentary circuitry, an ASIC, a FPGA or a micro controller, which is configured to operate the brushless fuel pump at an approximately constant speed.

12. The system of claim 11, wherein the status signal is indicative of an operational state of the primary control device.

13. The system of claim 12, wherein the multiplexer provides the output of the primary control device to the drive circuitry when the operational state of the primary control device is normal and provides the output of the secondary control device to the drive circuitry when the operational state of the primary control device is not normal.

14. The system of claim 11, wherein when the monitor circuit does not receive the signal from the primary control device at least once in a time period the status signal provided by the monitor circuit indicates that the primary control device is not operating normally.

15. The system of claim 11, wherein the primary control device is capable of operating the brushless fuel pump at a variety of speeds.

16. The system of claim 11, wherein the secondary control device has a substantially shorter initialization time than the primary control device.

* * * * *